US012261945B2

(12) United States Patent
Ramalingam et al.

(10) Patent No.: US 12,261,945 B2
(45) Date of Patent: Mar. 25, 2025

(54) GENERATING A SECURE ACCESS LINK TO A DOCUMENT USING A DOCUMENT ACCESS FACILITATOR

(71) Applicant: VOCALINK LIMITED, London (GB)

(72) Inventors: Sridhar Ramalingam, Wildwood, MO (US); Kuldeep Kumar, Dunstable (GB); Rekha Kusumanchi, Croxley Green (GB)

(73) Assignee: VOCALINK LIMITED, London (GB)

( * ) Notice: Subject to any disclaimer, the term of this patent is extended or adjusted under 35 U.S.C. 154(b) by 209 days.

(21) Appl. No.: 17/967,071

(22) Filed: Oct. 17, 2022

(65) Prior Publication Data

US 2024/0129112 A1  Apr. 18, 2024

(51) Int. Cl.
*H04L 9/08* (2006.01)
*G06F 40/289* (2020.01)

(52) U.S. Cl.
CPC .......... *H04L 9/0825* (2013.01); *G06F 40/289* (2020.01)

(58) Field of Classification Search
CPC ...... H04L 9/0825; G06F 40/289; G06Q 50/10
See application file for complete search history.

(56) References Cited

U.S. PATENT DOCUMENTS

| 5,465,206 | A | 11/1995 | Hilt et al. |
| 6,292,789 | B1 | 9/2001 | Schutzer |
| 8,214,289 | B2 | 7/2012 | Scipioni |
| 9,734,169 | B2 * | 8/2017 | Redlich ............... G06F 16/21 |
| 10,764,254 | B2 * | 9/2020 | Ford .................... H04W 12/02 |
| 2012/0061480 | A1 * | 3/2012 | Deligiannis ............ G05B 15/02 340/5.2 |
| 2015/0066753 | A1 | 3/2015 | Hall et al. |
| 2022/0067860 | A1 | 3/2022 | Li |
| 2023/0214508 | A1 * | 7/2023 | Munisamy ......... G06F 21/6218 726/29 |

OTHER PUBLICATIONS

Viets, Ana, "International Search Report & Written Opinion", International Application No. PCT/EP2023/075242, mailed Dec. 19, 2023, 16 pages.

* cited by examiner

*Primary Examiner* — Sm A Rahman
(74) *Attorney, Agent, or Firm* — Barta Jones, PLLC (57) ABSTRACT

The disclosure herein describes providing access to documents in a document storage platform using a document access facilitator. A base address and a security key associated with the document storage platform is obtained. A document summary presentation message is received from a presenter including a document identifier of a document and a recipient identifier of a recipient. A document summary presentation notification is sent to the recipient using the recipient identifier, the notification including the document identifier, and a document presentation request is received from the recipient. A secure access link to the document is generated using the base address, the document identifier, and the security key associated with the document storage platform. The secure access link is then sent to the recipient in response to the received document presentation request, whereby the recipient is enabled use the secure access link to access the document in the document storage platform.

20 Claims, 6 Drawing Sheets

GENERATING A SECURE ACCESS LINK TO A DOCUMENT USING A DOCUMENT ACCESS FACILITATOR

BACKGROUND

Companies and other entities make use of electronic documents for managing transactions and communicating with other parties. For instance, some companies use Biller Service Providers (BSPs) to provide detailed invoice documents to parties intended to pay the invoices. For security and other reasons, content management systems (CMSs), such as content hotels, are used to store these documents. However, when invoices and other related documents are stored across various systems and/or entities, managing these documents and ensuring that they are secure but available to payers becomes a significant challenge.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing access to documents in a document storage platform using a document access facilitator is described. A base address of the document storage platform and a security key of the document access facilitator are exchanged between the document access facilitator and the document storage platform during onboarding. A document summary presentation message is received from a presenter, the message including a document identifier associated with a document stored in the document storage platform and a recipient identifier associated with a recipient. A document summary presentation notification is sent to the recipient using the recipient identifier, the notification including the document identifier and notifying the recipient that the document is available for viewing by the recipient, and a document presentation request is received from the recipient, the request including the document identifier. A secure access link to the document is generated using the base address, the document identifier, and the security key of the document access facilitator. The secure access link is then sent to the recipient in response to the received document presentation request, whereby the recipient is enabled to use the generated secure access link to access the document in the document storage platform.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for providing secure access to documents stored in document storage platforms using a secure document access facilitator. The disclosure performs onboarding operations to form secure communication connections with document storage platforms and/or presenters of documents, including obtaining base addresses and sharing security keys of document access facilitators. Later, a document summary presentation message is received at the document access facilitator, indicating that a presenter wants to present a document to a recipient. The message includes a document identifier assigned to the document by the document storage platform and a recipient identifier. The document access facilitator notifies the recipient that a document is available for accessing. In some examples, the notification includes the payment request identifier and summary information associated with the document (e.g., an identifier of the presenter, description of the document, a total invoice amount, or the like). When the document access facilitator receives a document presentation request from the recipient that includes the document identifier and payment request identifier, it generates a secure access link. The secure access link is generated based on the base address of the document storage platform, the security key of the document access facilitator (e.g., data is digitally signed using a private key of the document access facilitator such that the data signature can be verified by the document storage platform using the public key of the document access facilitator that was shared during onboarding), and the document identifier. Further, in some examples, the secure access link is generated based on the recipient identifier and/or a validation timestamp for use in enabling the document storage platform to validate the secure access link when it is used. The generated secure access link is sent to the recipient, whereby the recipient is enabled to access the document on the document storage platform.

The disclosure operates in an unconventional manner at least by configuring a document access facilitator to generate secure access links for documents that can be used to directly access documents on any document storage platform. So long as the document access facilitator has onboarded a document storage platform, it can generate a secure access link that enables the recipient, and only the recipient, to use the link to access the document in a secure manner. Further, the security provided by the secure access link is enhanced through using digital signatures associated with exchanged security keys between document access facilitators and document storage platforms and/or through including a validation timestamp in the link, such that the link is only valid for a limited period of time. These operations improve the functioning of the underlying computing device.

Additionally, the disclosed secure access links as generated by the document access facilitator are configured to enable a recipient to directly access the associated document from the document storage platform, rather than the facilitator behaving as an interface between the platform and recipient for transferring the file. In this way, the disclosed facilitator avoids introducing additional steps that could compromise the security of the documents being accessed. This also consumes fewer computing resources (e.g., processing, storage, and/or network), thereby improving the functioning of the computing device.

Further, the disclosure enables recipients to request access to documents from a variety of different document storage platforms via a single document access facilitator, providing a user-friendly way for a recipient to quickly obtain links to all their documents.

In some examples, the disclosure enables Biller Service Providers (BSPs) to send detailed invoice documents, as stored by either a bill pay system (e.g., MASTERCARD BILL PAY) through a central storage system or as stored by a third-party external document storage platform (e.g., an external content management system (CMS) and/or content hotel), directly to Payer Institutions (PIs) that are connected to the disclosed document access facilitator. In examples where the BSPs have existing relations to document storage platforms in their relevant markets and use their services for document storage on a regular basis, they can confirm that a document storage platform is onboarded as an entity into the ecosystem of the document access facilitator and continue to leverage the services of the onboarded platform while using the document access facilitator to present invoices to payer recipients as described herein. Recipients are enabled to receive an invoice summary, request access to the associated invoice document, and then receive a securely signed uniform resource locator (URL) or other type of secure access link that directs the recipient directly to the invoice document in the document storage platform.

Further, the disclosure provides increased flexibility for BSPs, which are enabled to update the stored documents after the associated document summary presentation message has been sent. The document storage platform maintains the document identifier originally assigned to the document, so the document access facilitator is able to generate a secure access link to the updated document without receiving any information about the update.

Figure 1:
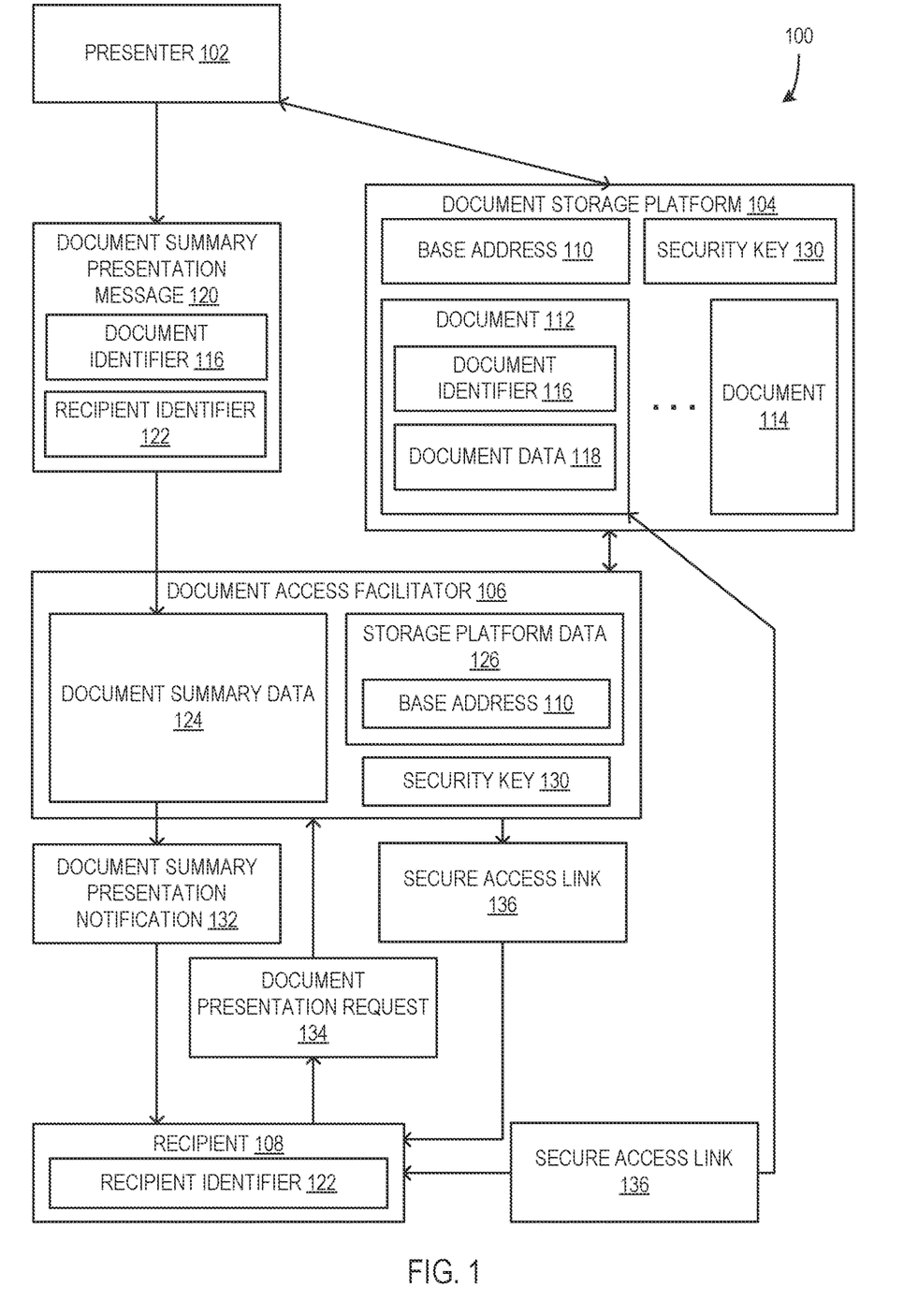
FIG. 1 is a block diagram illustrating a system configured to provide secure document access to documents in a document storage platform.

FIG. 1 is a block diagram illustrating a system 100 configured provide secure document access to documents 112-114 in a document storage platform 104. The presenter 102 deposits a document 112 on the document storage platform 104 (e.g., a content hotel, invoice hotel, or the like) and provides a document summary presentation message 120 identifying the document to a document access facilitator 106. The document access facilitator 106 notifies a recipient 108 that the document 112 is ready to be presented and the recipient 108 requests to access the document 112. The document access facilitator 106 generates and provides a secure access link 136 to the recipient 108 and the recipient 108 uses the secure access link 136 to access the document 112 from the document storage platform 104.

In some examples, the entities of the system 100 (e.g., the presenter 102, the document storage platform 104, the document access facilitator 106, and/or the recipient 108) include one or more computing devices (e.g., computing devices as described below with respect to FIG. 6) that are in communication with each other and/or computing devices of other entities of the system 100. Further, in some examples, the computing devices of the system are configured to communicate with each other via network connections over one or more computer networks (e.g., private networks such as private intranets, public networks such as the Internet, or the like). For example, the presenter 102 is a company that includes a plurality of users and computing devices and that uses the system 100 to send invoice documents to other entities such as customers or other companies. In such an example, the presenter 102 includes a plurality of computing devices that are in communication with each other over a private network and at least some of those computing devices are in communication with computing devices of the document storage platform 104 and the document access facilitator 106 (e.g., via the Internet or other public network). Further, in some examples, the document storage platform 104, the document access facilitator 106, and/or other entities of the system 100 are configured to expose application program interfaces (APIs) for use in facilitating the described communications between the entities of the system 100. In other examples, other arrangements and/or organizations of computing devices configured to enable the operations of the entities of system 100 as described herein are used without departing from the description.

In some examples, the presenter 102 includes hardware, firmware, and/or software configured to send documents (e.g., document 112) to the document storage platform 104 for storage and to send document summary presentation messages 120 (e.g., payment requests associated with invoice documents) to the document access facilitator 106 to notify the facilitator 106 that documents in the document storage platform 104 are ready for recipients (e.g., recipient 108) to access. Further, when a document 112 is sent to the document storage platform 104 for storage, the platform 104 assigns a document identifier 116 to the document 112 and provides the document identifier 116 to the presenter 102. The presenter 102 is configured to generate the document summary presentation message 120 using the document identifier 116 and a recipient identifier 122 of the recipient 108 to whom the document 112 is to be presented. Additionally, or alternatively, the document summary presentation message 120 is configured to include a base address 110 or other identifier of the document storage platform 104 such that the document access facilitator 106 is informed as to the identity of the document storage platform 104 upon which the document 112 is stored. In some such examples, the document summary presentation message 120 is a payment request message that includes a field for a document reference number into which the document identifier 116 is inserted prior to sending the message to the document access facilitator 106 as described herein. Further, in other examples, the recipient identifier 122 is not included in the document summary presentation message 120 without departing from the description.

The document storage platform 104 includes hardware, firmware, and/or software configured to receive, store, and provide access to documents 112-114 by other entities in the system 100. In some examples, the document storage platform 104 is configured to enforce security protocols and/or perform other security operations to protect the stored documents 112-114 from being accessed or otherwise interacted with by parties that are not allowed access. Further, the document storage platform 104 includes a base address 110 (e.g., a URL address or the like) that can be used to access the document storage platform 104 over a network connection. The document storage platform 104 is configured to assign documents 112-114, stored thereon, document identifiers 116 that enable the document storage platform 104 to identify and/or track the documents 112-114 and also enable the document storage platform 104 to inform other entities of the system 100 as to how to access the documents 112-114. The document identifier 116 is used to generate the secure access link 136 that the recipient 108 uses to access the document 112 as described herein.

The document access facilitator 106 includes hardware, firmware, and/or software configured to receive and process document summary presentation messages 120 from presenters 102 and to interact with recipients 108 to enable the recipients 108 to securely access documents 112-114 on document storage platforms 104.

In some examples, the document access facilitator 106 is configured to onboard one or more document storage platforms 104. The onboarding process includes obtaining storage platform data 126 from each document storage platform 104, including a base address 128 and sharing a security key 130 of the document access facilitator 106 with the document storage platform 104. In some examples, sharing the security key 130 includes exchanging security information with the document storage platform 104 (e.g., providing a public key to the document storage platform 104 that is paired with a private key kept by the document access facilitator 106), such that future communications between the document access facilitator 106 and the document storage platform 104 can be verified through the use of digital signatures or other security protocols. Additionally, or alternatively, the exchanged security keys, including the security key 130 of the facilitator 106 received by the platform 104, enables the facilitator 106 to generate the secure access link 136 in such a way that the platform 104 can verify and/or validate the secure access link 136 when it is used by the recipient 108.

It should be understood that, in some examples, the document access facilitator 106 is configured to onboard and communicate with multiple document storage platforms 104, enabling a recipient 108 to access documents stored in multiple platforms via a single document access facilitator 106. In such examples, the generated secure access links 136 are based on the base addresses of the separate document storage platforms in addition to the document identifiers of the documents to be accessed, such that the recipient 108 is enabled to use the links 136 received from the facilitator 106, regardless of which document storage platforms are referenced by the links 136. Further, in such examples, the document access facilitator 106 is configured to include flexible interfaces that are compatible with each type of document storage platform that is onboarded by the document access facilitator 106. Additionally, or alternatively, in examples where the document access facilitator 106 is configured to onboard multiple document storage platforms 104, each document storage platform 104 is enabled to use different document retention policies and/or other data management policies without departing from the description. In such examples, the onboarding process between the facilitator 106 and a platform 104 includes notification to the facilitator 106 about established policies that affect the operations of the facilitator 106 (e.g., in examples where a platform 104 stores documents only for a limited time, the document access facilitator 106 is notified of this limitation and the facilitator 106 is then configured to notify the recipient 108 of the limited time period via the document summary presentation notification 132).

Further, in some examples, the document access facilitator 106 is configured to send a document summary presentation notification 132 to the recipient 108 of a document 112 from the presenter 102. The document summary presentation message 120 is received by the facilitator 106 and the data therein is stored as document summary data 124 at the facilitator 106. The facilitator 106 generates a document summary presentation notification 132 from the document summary data 124 and sends the notification 132 to the recipient 108. In some examples, the recipient identifier 122 is used to identify the recipient 108 to which to send the notification 132. Additionally, or alternatively, the notification 132 includes some portion or all of the document summary data 124 from the document summary presentation message 120 (e.g., the document identifier 116 and/or the recipient identifier 122). Further, in some examples, other document summary data 124 is included in the document summary presentation notification 132, such as an identifier of the presenter 102, a summary or other contextual information about the document 112, or the like.

For instance, in an example, the document 112 is an invoice or bill from the presenter 102 to the recipient 108 and the document summary presentation message 120 includes a summary of the invoice (e.g., a total amount due, a description of the purpose of the invoice, identifying information of the presenter 102, date and/or time information associated with the invoice or an associated transaction, or the like). In such an example, the document summary presentation notification 132 includes some or all of the summary of the invoice in addition to the other data described herein.

Alternatively, in another example, the document 112 is an invoice from a utility provider and the notification to the recipient includes summary information. The summary information includes an identifier of the utility provider, an amount due, a date due, and an account number with which the invoice is associated. The full invoice, when accessed by the recipient using a secure access link 136 as described herein, includes more detailed invoice information, such as quantities used during the month (e.g., gas usage, water usage, or the like), details of the current usage plan, comparisons to other months of usage and/or usage by other parties in the area, or the like.

The document summary presentation notification 132 provides the recipient 108 with the document identifier 116 of the document 112, enabling the recipient to send a document presentation request 134 to the document access facilitator 106. In some examples, the document presentation request 134 includes the document identifier 116 of the document 112 and an identifier of the document presentation request 134, enabling the document access facilitator 106 to identify the document being requested.

When the document access facilitator 106 receives a document presentation request 134, it is configured to generate a secure access link 136 and provide it to the requesting recipient 108. In some examples, the generation of the secure access link 136 is based on the base address 110 of the data storage platform 104, the security key 130 of the document access facilitator 106 (e.g., a private key paired to a public key shared with the platform 104 as described herein), and the document identifier 116 of the document 112 to be accessed. Further, in some such examples, the generation of the secure access link 136 includes adding the recipient identifier 122 and/or other validation information, such as a timestamp, to the secure access link 136, such that the link 136 is only considered valid by the document storage platform 104 for a limited time period.

For instance, in an example where the secure access link 136 is generated in the form of a URL address, the base address 110 is used as the base address of the link and the link is modified to reflect the document identifier 116. A token or other value is digitally signed or otherwise modified using the security key 130 such that the document storage platform 104 is enabled to verify the digital signature or otherwise revert the token back to its original state, whereby the document storage platform 104 can validate the secure access link 136. Further, the timestamp is appended to the URL address, enabling the document storage platform 104 to check the timestamp against a current time value and reject access to the document 112 if the timestamp differs too greatly from the current time value (e.g., if the secure access link 136 is more than ten minutes old or a different time threshold is used).

Further, in some examples, the secure access link 136 is generated to include a "replay tag" that can be used by the document storage platform 104 to confirm that the secure access link 136 has only been used once. For instance, a replay tag value is included in the secure access link 136 (e.g., as part of an encrypted portion/digital signature) when generated by the document access facilitator 106 and, when the secure access link 136 data is received by the document storage platform 104, the platform 104 determines whether that replay tag value has been received previously. In some such examples, the document access facilitator 106 generates new, unused replay tag values by incrementing previous values or by generating random values from a sufficiently large pool of possible values that generation of repeated values is highly unlikely. This further enhances the security of the documents stored therein.

The secure access link 136 is provided to the recipient 108, and the recipient 108 is enabled to use the secure access link 136 to access the document 112 and the document data 118 therein on the document storage platform 104. For instance, if the secure access link 136 is a URL address, the URL address is used with a web browser application to access the document 112.

In some examples, the document storage platform 104 is configured to validate the secure access link 136 prior to providing the recipient 108 access to the document 112. Such validation includes the comparison of timestamp information to a current time as described above. Additionally, or alternatively, the document storage platform 104 applies a security operation associated with the security key 130 received from the document access facilitator 106 to at least a portion of the data included in the secure access link 136 to verify that the secure access link 136 was generated by the document access facilitator 106, which has been provided the security key 130. In some such examples, this validation is done using exchanged cryptographic keys (e.g., the security key 130). Alternatively, other validation methods are used without departing from the description.

It should be understood that, in some examples, in addition to the validation methods described above, other communications between entities of the system 100 are secured via digital signature or other methods without departing from the description. For instance, in some such examples, the document access facilitator 106 is configured to validate the identities of the presenter 102 and/or the recipient 108 when communicating with them. For example, upon receiving a document presentation request 134 from a recipient 108, the facilitator 106 verifies that the presenter 102 of the document 112 being requested has provided a document summary presentation message 120 that is targeted at the recipient 108 via the recipient identifier 122. In other examples, other methods of securing and/or validating communications between entities of the system 100 are used without departing from the description.

In some examples, the document access facilitator 106 is configured to provide document summary presentation notifications 132 to a recipient 108 based on the recipient 108 having multiple documents ready for presentation on the document storage platform 104 and/or other similar document storage platforms. For example, there are three different documents available for access by the recipient 108 based on document summary presentation messages 120 received from multiple presenters 102 by the document access facilitator 106. The document access facilitator 106 generates and sends a document summary presentation notification 132 that includes a report of all three documents that are available for the recipient 108. In some such examples, the report includes summary information for each of the available documents and the recipient 108 is enabled to request access to one or more of the documents described in the report. A request 134 for access to multiple documents causes the document access facilitator 106 to generate secure access links 136 for each of the requested documents, which are provided to the recipient separately or in a combined list of links or other data structure.

It should be understood that, while the document summary presentation notification 132 is illustrated as being sent directly to the recipient 108, in other examples, the notification 132 it sent to the recipient 108 via another entity or entities. For instance, in some examples, the notification 132 is sent to a financial institution (e.g., a debtor financial institution (DFI)) or other similar entity. The entity then forwards or otherwise provides the notification 132 or associated information to the recipient 108. In some such examples, the recipient 108 interacts with the system via this intermediate entity, including sending the document presentation request 134 to the document access facilitator 106, receiving the secure access link 136, and/or using the secure access link 136 to access the document 112 on the document storage platform 104, without departing from the description.

Figure 2:
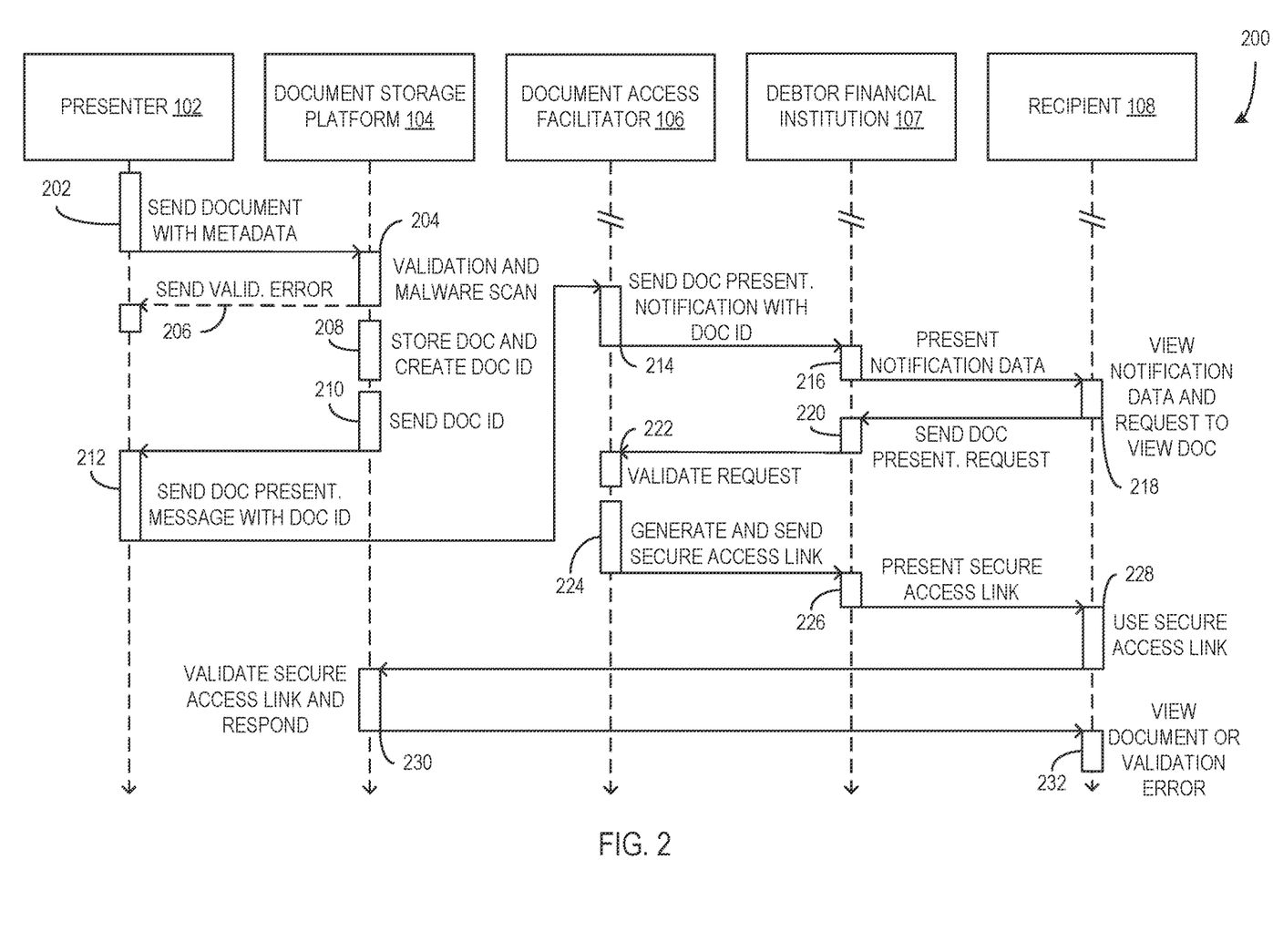
FIG. 2 is a sequence diagram illustrating a process of providing secure access to an invoice document via a document access facilitator and a debtor financial institution.

FIG. 2 is a sequence diagram illustrating a process 200 of providing secure access to an invoice document via a document access facilitator 106 and a debtor financial institution 107. In some examples, the process 200 is executed or otherwise performed in a system such as system 100 of FIG. 1.

At 202, the presenter 102 (e.g., a creditor financial institution (FI)) sends the invoice document with metadata to the document storage platform 104 for storage thereon. At 204, the document storage platform 104 performs validation and malware scanning processes on the received invoice document. In some examples, these processes are performed based on the metadata included with the invoice document. Further, in some examples, the validation process includes validating security information included with the invoice document based on previously exchanged security keys (e.g., using cryptography and exchanged keys to validate the document).

If the validation fails and/or malware is identified in the invoice document, the document storage platform 104 sends an error to the presenter 102 at 206. In such examples, the process 200 ends, as the document storage platform 104 does not store the unvalidated and/or malware-infected invoice document, preventing the rest of process 200 from being performed.

If the validation succeeds and no malware is identified in the invoice document, the document storage platform 104 stores the document and creates a document ID (e.g., document ID 116) that identifies the invoice document within the data structure of the document storage platform 104. The created document ID is sent to the presenter 102 at 210 to confirm that the invoice document has been stored at the document storage platform 104 and is ready to be accessed using the document ID.

At 212, the presenter 102 sends a document summary presentation message with the document ID to the document access facilitator 106. In some examples, the document access facilitator 106 has already performed onboarding processes with the presenter 102 and/or the document storage platform 104 such that communications between the document access facilitator 106 and the presenter 102 and/or the document storage platform 104 can be secured. Further, in some examples, the document summary presentation message includes a request for payment associated with the invoice document and associated invoice or payment summary information (e.g., a payer identifier, a total due, a description of the reason for the payment, or the like).

At 214, the document access facilitator 106 sends a document summary presentation notification with the document ID to a debtor FI 107. In some examples, the document summary presentation message from the presenter 102 includes an identifier of the debtor FI 107, enabling the document access facilitator 106 to determine to which FI to send the document summary presentation notification. Further, in some examples, the document summary presentation notification includes an invoice or payment summary that includes the summary information from the document summary presentation message.

At 216, the debtor FI 107 presents the notification data to the recipient 108 (e.g., a payer), including the document ID and/or document information that informs the recipient 108 about the invoice document and how to access the invoice document. In some examples, the document summary presentation notification includes payer identification data that enables the debtor FI 107 to identify the recipient 108 of the invoice document.

At 218, the recipient 108 views the notification data and requests to view the invoice document. The payer's request is sent to the debtor FI 107, which forwards the request to the document access facilitator 106 at 220.

At 222, the document access facilitator 106 validates the request to view the invoice document from the recipient 108. In some examples, the validation includes verifying that the invoice document is intended to be viewed by the recipient 108 based on data included with the document summary presentation message from the presenter 102.

At 224, the document access facilitator 106 generates and sends a secure access link (e.g., secure access link 136) to the debtor FI 107, which presents the secure access link to the recipient 108 at 226. At 228, the recipient 108 uses the secure access link to access the invoice document on the document storage platform 104. In some examples, the secure access link includes a custom-generated URL address that the recipient 108 uses with a web browser or other similar application to access the invoice document via a network connection as described herein.

At 230, the document storage platform 104 validates the secure access link and responds to the associated request for access to the invoice document. In some examples, the validation of the secure access link includes using a security key associated with a key exchange with the document access facilitator 106 to verify a digital signature of the secure access link (e.g., decrypting a portion of data using the security key), thereby verifying that the secure access link was generated by the document access facilitator 106. Further, in some examples, the validation includes the document storage platform 104 evaluating a timestamp or other similar data included in the secure access link to confirm that the link has not expired based on an established time threshold of the document storage platform. For example, secure access links are only valid for ten minutes, one hour, or another period of time after generation to enhance the security of documents stored in the document storage platform 104.

If the document storage platform 104 validates the secure access link, it responds by providing the recipient 108 access to the invoice document and/or sending the invoice document to the recipient 108. For instance, in an example, the document storage platform 104 enables the recipient 108 to view the invoice document in a web browser application and/or download the invoice document over a network connection with the document storage platform 104.

Alternatively, if the document storage platform 104 does not validate the secure access link, it responds by sending a validation error message to the recipient 108. In some examples, such an error message includes information describing why the validation failed and/or instructions to the recipient 108 for how to try viewing the invoice document again. For example, if the secure access link is expired when the recipient 108 tries to access the invoice document, the validation error message instructs the recipient 108 to request access to the document again, obtain a new secure access link, and use the link within the valid timeframe.

At 232, the recipient 108 views the invoice document or validation error message sent by the document storage platform 104.

Figure 3:
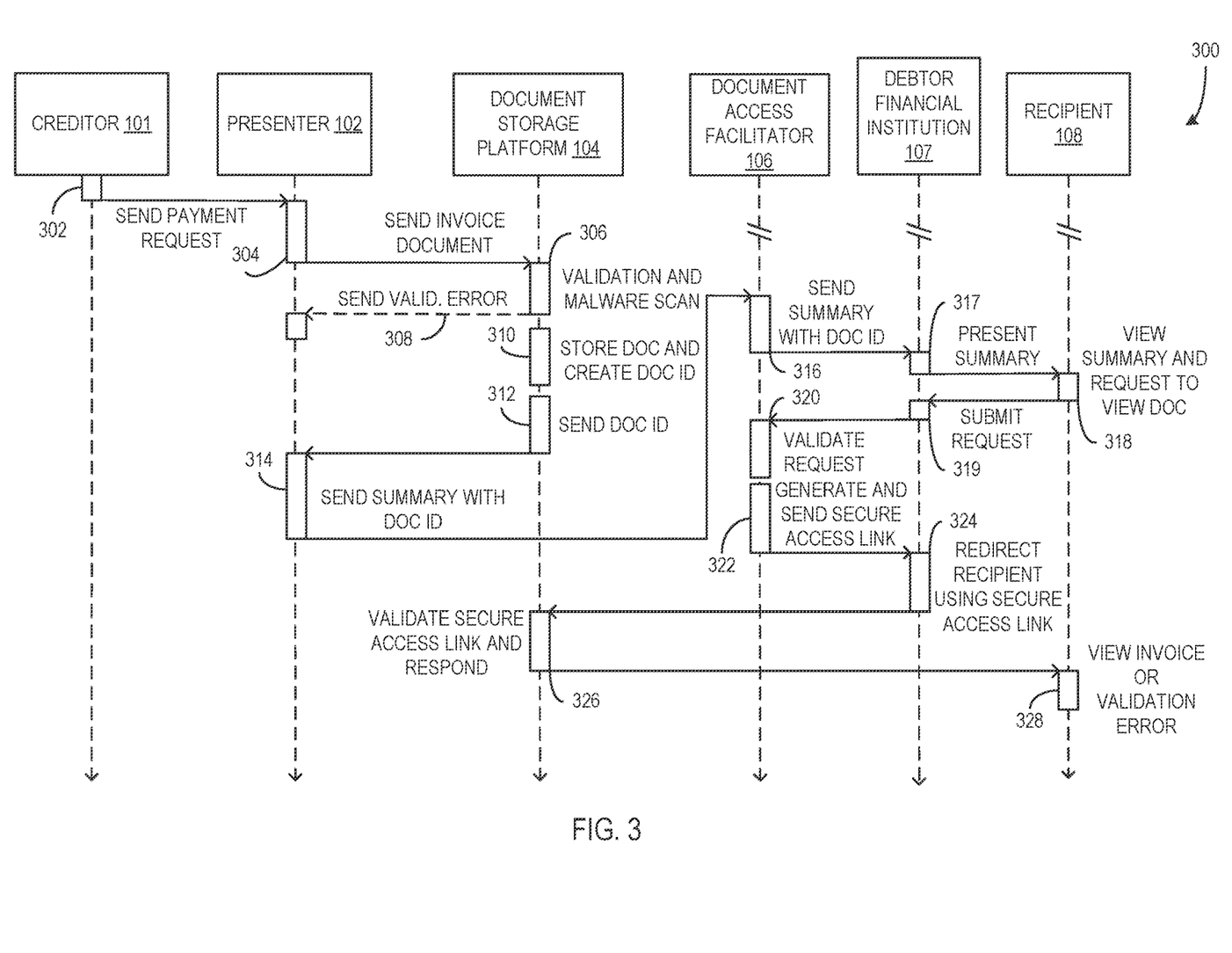
FIG. 3 is a sequence diagram illustrating a process of providing secure access to an invoice document via a combination of a presenter, a document storage platform, and a document access facilitator.

FIG. 3 is a sequence diagram illustrating a process 300 of providing secure access to an invoice document via a combination of a presenter 102, a document storage platform 104, and a document access facilitator 106. In some examples, the process 300 is executed or otherwise performed in a system such as system 100 of FIG. 1. Further, it should be understood that the process 300 operates in substantially the same manner, except that the creditor 101 uses a presenter 102, such as a creditor service provider, to interact with the document storage platform 104 and document access facilitator 106.

At 302, the creditor 101 sends a payment request to the presenter 102. In some examples, the payment request includes an invoice/bill and/or data associated with a transaction for which a payment is being requested (e.g., a detailed payment request). At 304, in response to the payment request, the presenter 102 sends an invoice document to the document storage platform 104, where the invoice document is from the presenter 102 and/or generated based on the payment request from the creditor 101.

At 306, the document storage platform 104 performs validation and malware scan processes on the received invoice document. If the validation process fails and/or the malware scan reveals malware present in the invoice document, the document storage platform 104 sends a validation error to the presenter 102 at 308. Alternatively, the document storage platform 104 stores the invoice document and generates an associated document ID at 310 and sends the document ID to the presenter 102 at 312. It should be understood that, in some examples, 306-312 are performed in substantially the same manner as 204-210 of process 200 of FIG. 2.

At 314, the presenter 102 sends a summary with the document ID (e.g., a document summary presentation message 120) to the document access facilitator 106. In some examples, the payment request includes a payer ID of recipient 108, an identifier of an associated FI as described above, and/or other information about the payment and/or associated transaction.

At 316, the document access facilitator 106 sends an invoice summary including the document ID to the debtor FI 107 and the debtor FI 107 presents the summary to the recipient 108 at 317. At 318, the recipient 108 views the summary and requests to view the invoice document. The request from the recipient 108 to the debtor FI 107 is submitted to the document access facilitator 106 at 319. The submitted request includes the document ID such that the document access facilitator 106 is informed as to which document the recipient 108 is requesting to access.

At 320, the document access facilitator 106 validates the request from the recipient 108 and, based on a successful validation, the document access facilitator 106 generates and sends a secure access link associated with the invoice document to the recipient 108 at 322.

At 324, the debtor FI 107 receives the secure access link and uses it to redirect the recipient 108 to access the invoice document. At 326, the document storage platform 104 validates the secure access link and responds to the request for access to the invoice document. At 328, the recipient 108 views the invoice document or a validation error, depending on whether the document storage platform 104 validates the request by the recipient 108.

Figure 4:
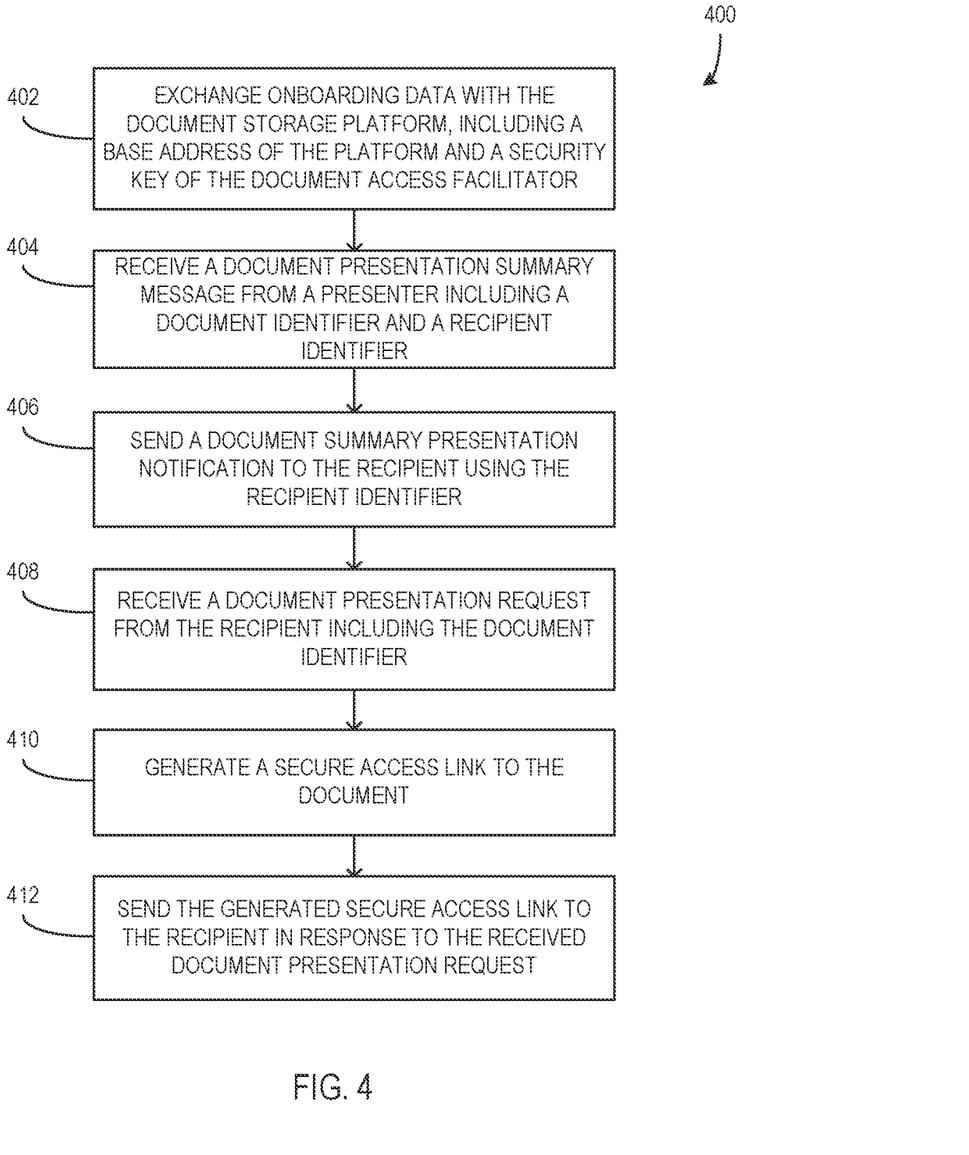
FIG. 4 is a flowchart illustrating a method for providing access to a document in a document storage platform using a document access facilitator.

FIG. 4 is a flowchart illustrating a method 400 for providing access to a document (e.g., document 112) in a document storage platform (e.g., document storage platform 104) using a document access facilitator (e.g., document access facilitator 106). In some examples, the method 400 is executed or otherwise performed in a system such as system 100 of FIG. 1.

At 402, the document access facilitator exchanges onboarding data with the document storage platform. In some examples, the onboarding data includes a base address of the document storage platform and a security key of the document access facilitator. Further, in some examples, this is done in an onboarding process during which the document access facilitator shares a public key, which is paired with a private key kept by the document access facilitator, with the document storage platform, enabling the two entities to secure the communications between them.

At 404, a document summary presentation message is received from a presenter. The message includes a document identifier and a recipient identifier. Further, in some such examples, the document summary presentation message includes other information that enables the document access facilitator to communicate with the recipient (e.g., an identifier of a FI used by the recipient) and/or information that the document access facilitator can used to validate the message from the presenter.

At 406, a document summary presentation notification is sent to the recipient using the recipient identifier. In some examples, the document summary notification is sent to the recipient via a debtor FI or other service provider (e.g., the debtor FI 107 as described in FIGS. 2 and 3). Further, the notification includes the document identifier and/or other information associated with the document, such as description or context information of the document, total amount and/or other invoice summary information in examples where the document includes an invoice, or the like.

At 408, a document presentation request is received from the recipient including the document identifier. In some examples, the request is received after a period of time has passed since the document summary presentation notification was sent (e.g., a recipient does not need to immediately respond to the notification). Further, the request need only include the document identifier if the document identifier is sufficiently unique. Alternatively, the request further includes an identifier of the document storage platform upon which the document is stored, such that the document access facilitator is enabled to determine the document being requested without any ambiguity that may be caused by document identifiers from separate document storage platforms overlapping.

At 410, the document access facilitator generates a secure access link to the document in response to the request. In some examples, the document access facilitator first validates the request from the recipient before generating the secure access link (e.g., confirming that the recipient is intended to be able to access the document). Further, the secure access link is generated using the base address of the document storage platform, the document identifier, and the recipient identifier. At least some portion of the secure access link is digitally signed or otherwise transformed using the security key of the document access facilitator, enabling the document storage platform to verify that the secure access link is generated by the trusted document access facilitator. Additionally, or alternatively, a validity timestamp is embedded in the secure access link, such that when the link is used to access the document, the document storage platform is enabled to evaluate the validity timestamp.

In some examples, the secure access link is a URL address (e.g., a URL address that begins with the base address of the document storage platform ("https://www.<base address>.com")) that can be used with a web browser application or other similar application. By using the URL address in such an application, the secure access link enables a recipient to view and/or download the associated document over a secure network link (e.g., via the Internet).

At 412, the generated secure access link is sent to the recipient in response to the received document presentation request. The recipient is enabled to access the document in the document storage platform using the secure access link. Alternatively, in some examples, validation of the request by the recipient fails at the document access facilitator, such that the facilitator responds with a validation error message, and the recipient is enabled to view the validation error message as described herein.

In some examples, the document is an invoice, the presenter is a creditor with respect to the invoice, and the recipient is a debtor with respect to the invoice. Further, the document summary presentation notification includes an invoice summary including at least one invoice amount and at least one transaction description. Additionally, or alternatively, the invoice summary includes identifying information of the creditor, date and time information of a transaction, or the like.

Additionally, or alternatively, in some examples, sending the document presentation request and sending the generated secure access link to the recipient includes sending the document presentation request and generated secure access link to a financial institution with which the recipient is associated, whereby the financial institution is enabled to forward the document presentation request and generated secure access link to the recipient.

Figure 5:
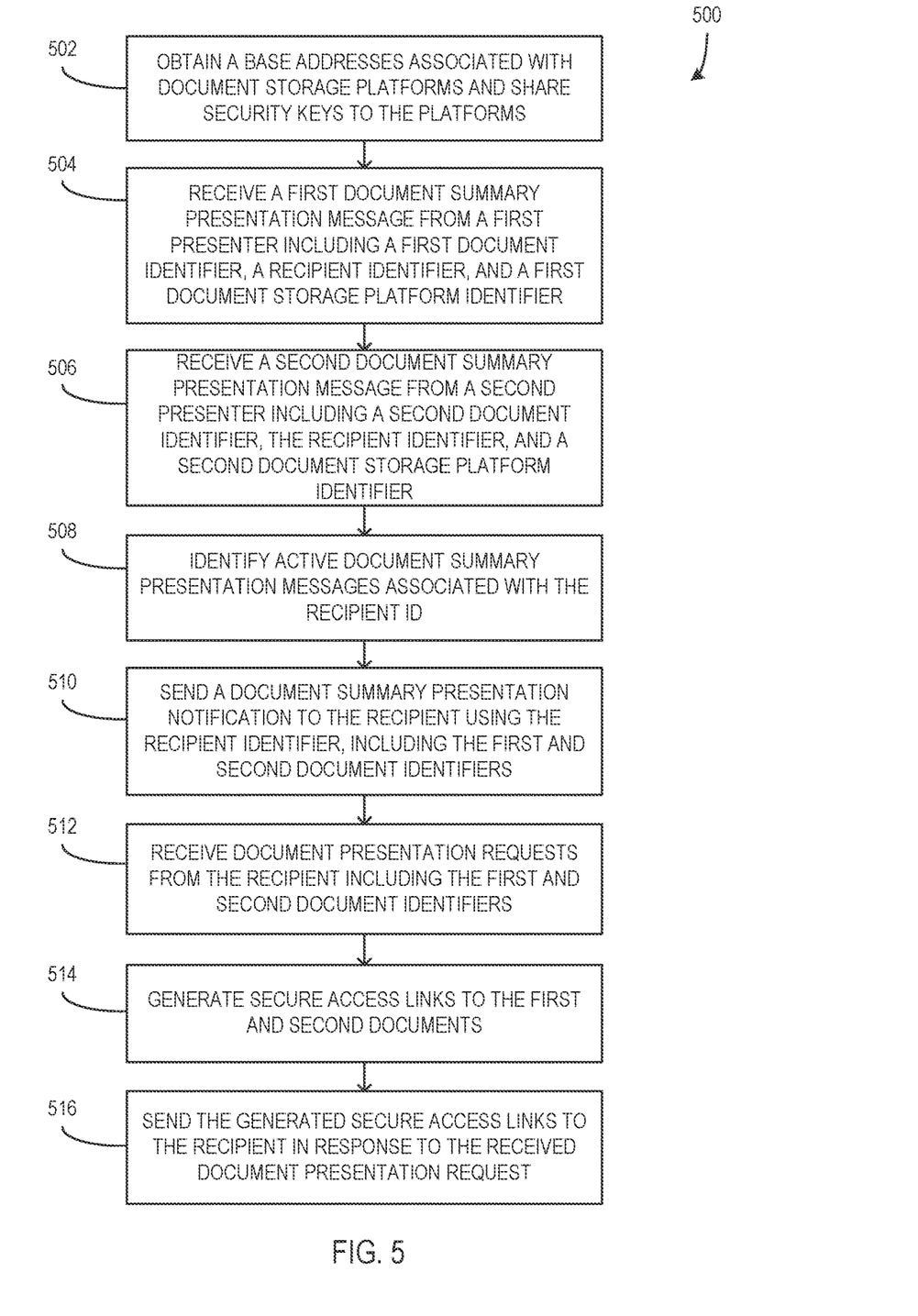
FIG. 5 is a flowchart illustrating a method for providing access to multiple documents in multiple document storage platforms using a document access facilitator.

FIG. 5 is a flowchart illustrating a method 500 for providing access to multiple documents (e.g., document 112) in multiple document storage platforms (e.g., document storage platform 104) using a document access facilitator (e.g., document access facilitator 106). In some examples, the method 500 is executed or otherwise performed by a system such as system 100 of FIG. 1.

At 502, the document access facilitator obtains base addresses associated with at least two document storage platforms and shares security key data with the at least two document storage platforms. In some examples, this is done in an onboarding process during which the document access facilitator shares a public key with the document storage platforms while storing a private key paired with the public key, enabling the entities to secure the communications between them.

At 504, a first document summary presentation message is received from a first presenter. The first message includes a first document identifier, a first document storage platform identifier, and a recipient identifier. At 506, a second document summary presentation message is received from a second presenter. The second message includes a second document identifier, a second document storage platform identifier, and the recipient identifier. The document access facilitator has obtained information from both document storage platforms with which the first and second document storage platform identifiers are associated.

At 508, the document access facilitator identifies the active document summary presentation messages associated with the recipient identifier. The active document summary presentation messages include the messages received at 504 and 506. In some examples, document summary presentation messages are configured to be 'active' or otherwise valid for a limited period of time. Further, in some such examples, the document access facilitator is configured to periodically identify active document summary presentation messages for which the recipient has not been notified and to send one or more notifications to the recipient associated with those identified messages.

At 510, the document access facilitator sends a document summary presentation notification to the recipient using the recipient identifier, wherein the notification notifies the recipient of the first and second documents using the first and second document identifiers. In some examples, the notification includes description, context, and/or other summary information associated with each of the first and second documents, including information about the presenters of the documents and/or the document storage platforms upon which the documents are stored. Further, in some such examples, the document summary presentation notification includes providing the recipient with a report document and/or interface that enables the user to view the summary information of both documents at the same time and/or in the same interface.

At 512, the document access facilitator receives document presentation requests from the recipient including the first and second document identifiers (e.g., a first document presentation request including the first document identifier and a second document presentation request including the second document identifier), indicating that the recipient wants to access both documents.

At 514, the document access facilitator generates secure access links to the first and second documents. It should be understood that the generation of each of the secure access links is performed in substantially the same way as described above at least with respect to 410 of method 400.

At 516, the generated secure access links are sent to the recipient in response to the received document presentation requests. The recipient is enabled to access the first and second documents using the secure access links as they wish. In some examples, the accessing of each of the first and second documents are separate processes as the recipient is directly contacting the first and second separate document storage platforms upon which the first and second documents are stored, respectively. Further, in some such examples, the document access facilitator provides the recipient with a document viewing interface that enables the user to use the secure access links of the first and second documents to access those documents and view them within the provided document viewing interface at substantially the same time.

Exemplary Operating Environment

Figure 6:
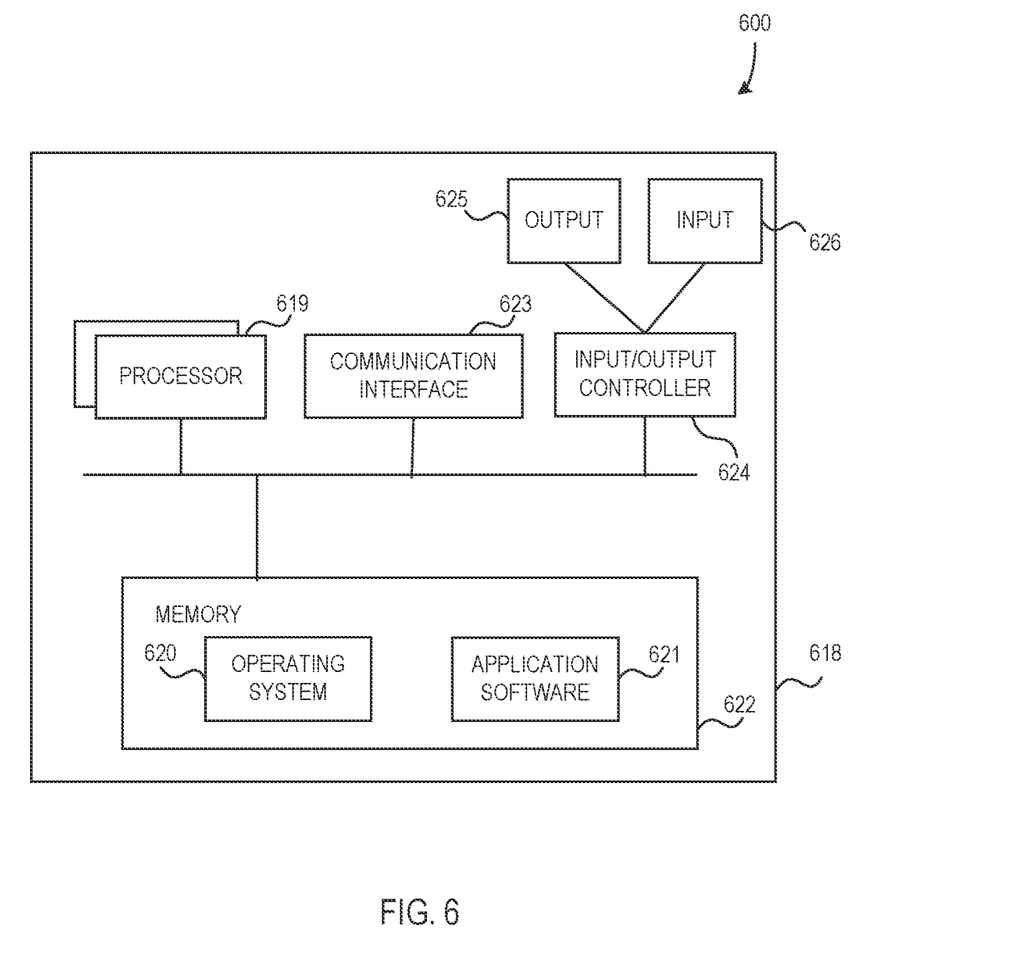
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, providing access to a document in a document storage platform using a document access facilitator as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor of a document access facilitator; and at least one memory comprising computer program code, the at least one memory and the computer program code configured to, with the at least one processor, cause the at least one processor to: exchange onboarding data with a document storage platform, the onboarding data including a base address of the document storage platform and a security key of the document access facilitator; receive a document summary presentation message from a presenter, the document summary presentation message including a document identifier associated with a document stored in the document storage platform and a recipient identifier associated with a recipient; send a document summary presentation notification to the recipient using the recipient identifier, the document summary presentation notification including the document identifier and notifying the recipient that the document stored in the document storage platform is available for viewing by the recipient; receive a document presentation request from the recipient, the document presentation request including the document identifier; generate a secure access link to the document using the base address, the document identifier, and the security key associated with the document storage platform; and send the generated secure access link to the recipient in response to the received document presentation request, whereby the recipient is enabled to use the generated secure access link to access the document in the document storage platform.

An example computerized method comprises: exchanging, by a document access facilitator, onboarding data with a document storage platform, the onboarding data including a base address of the document storage platform and a security key of the document access facilitator; receiving a document summary presentation message from a presenter, the document summary presentation message including a document identifier associated with a document stored in the document storage platform and a recipient identifier associated with a recipient; sending a document summary presentation notification to the recipient using the recipient identifier, the document summary presentation notification including the document identifier and notifying the recipient that the document stored in the document storage platform is available for viewing by the recipient; receiving a document presentation request from the recipient, the document presentation request including the document identifier; generating a secure access link to the document using the base address, the document identifier, and the security key associated with the document storage platform; and sending the generated secure access link to the recipient in response to the received document presentation request, whereby the recipient is enabled to use the generated secure access link to access the document in the document storage platform.

One or more computer storage media have computer-executable instructions that, upon execution by a processor, cause the processor to at least: exchange onboarding data with a document storage platform, the onboarding data including a base address of the document storage platform and a security key of a document access facilitator; receive a document summary presentation message from a presenter, the document summary presentation message including a document identifier associated with a document stored in the document storage platform and a recipient identifier associated with a recipient; send a document summary presentation notification to the recipient using the recipient identifier, the document summary presentation notification including the document identifier and notifying the recipient that the document stored in the document storage platform is available for viewing by the recipient; receive a document presentation request from the recipient, the document presentation request including the document identifier; generate a secure access link to the document using the base address, the document identifier, and the security key associated with the document storage platform; and send the generated secure access link to the recipient in response to the received document presentation request, whereby the recipient is enabled to use the generated secure access link to access the document in the document storage platform.

Alternatively, or in addition to the other examples described herein, examples include any combination of the following:
- wherein generating the secure access link includes including a validity timestamp in the secure access link, whereby the document storage platform is enabled to validate the secure access link based on the validity timestamp.
- further comprising: validating the document presentation request based on the recipient from which the document presentation request is received matching the recipient of the recipient identifier included in the document summary presentation message; and wherein generating the secure access link occurs after the document presentation request is validated.
- wherein generating the secure access link includes digitally signing a portion of data of the secure access link using the security key, whereby the document storage platform is enabled to verify the digitally signed portion of data to validate the secure access link when the secure access link is used by the recipient to access the document.
- further comprising: exchanging onboarding data with a second document storage platform, the onboarding data exchanged with the second document storage platform including a second base address of the second document storage platform and the security key of the document access facilitator; receiving a second document summary presentation message from a second presenter, the second document summary presentation message including a second document identifier associated with a second document stored in the second document storage platform and the recipient identifier associated with the recipient; and wherein the document summary presentation notification further includes the second document identifier and notifies the recipient that the second document stored in the second document storage platform is available for viewing by the recipient.
- wherein the document is an invoice, the presenter is a creditor with respect to the invoice, and the recipient is a debtor with respect to the invoice; and wherein the document summary presentation notification includes an invoice summary including at least one invoice amount and at least one transaction description.
- wherein sending the document presentation request and sending the generated secure access link to the recipient includes sending the document presentation request and generated secure access link to a financial institution with which the recipient is associated, whereby the financial institution is enabled to forward the document presentation request and generated secure access link to the recipient.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for exchanging, by a document access facilitator, onboarding data with a document storage platform, the onboarding data including a base address of the document storage platform and a security key of the document access facilitator; exemplary means for receiving a document summary presentation message from a presenter, the document summary presentation message including a document identifier associated with a document stored in the document storage platform and a recipient identifier associated with a recipient; exemplary means for sending a document summary presentation notification to the recipient using the recipient identifier, the document summary presentation notification including the document identifier and notifying the recipient that the document stored in the document storage platform is available for viewing by the recipient; exemplary means for receiving a document presentation request from the recipient, the document presentation request including the document identifier; exemplary means for generating a secure access link to the document using the base address, the document identifier, and the security key associated with the document storage platform; and exemplary means for sending the generated secure access link to the recipient in response to the received document presentation request, whereby the recipient is enabled to use the generated secure access link to access the document in the document storage platform.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor of a document access facilitator; and
   at least one memory comprising computer program code, the at least one memory and the computer program code configured to, with the at least one processor, cause the at least one processor to:
   exchange onboarding data between a document storage platform and the document access facilitator, the onboarding data including a base address of the document storage platform and a security key of the document access facilitator;
   receive a document summary presentation message from a presenter, the document summary presentation message including a document identifier associated with a document stored in the document storage platform and a recipient identifier associated with a recipient;
   send a document summary presentation notification to the recipient using the recipient identifier, the document summary presentation notification including the document identifier and notifying the recipient that the document stored in the document storage platform is available for viewing by the recipient;
   receive a document presentation request from the recipient, the document presentation request including the document identifier;
   generate a secure access link to the document using the base address, the document identifier, and the security key of the document access facilitator; and
   send the generated secure access link to the recipient in response to the received document presentation request, causing the recipient to use the generated secure access link to access the document in the document storage platform.

2. The system of claim 1, wherein the secure access link includes a replay tag that is used by the document storage platform to confirm that the secure access link is used only once.

3. The system of claim 1, wherein the at least one memory and the computer program code is further configured to, with the at least one processor, cause the at least one processor to:
   validate the document presentation request based on the recipient from which the document presentation request is received matching the recipient of the recipient identifier included in the document summary presentation message; and
   wherein generating the secure access link occurs after the document presentation request is validated.

4. The system of claim 1, wherein generating the secure access link includes digitally signing a portion of data of the secure access link using the security key, whereby the document storage platform is enabled to verify the digitally signed portion of data to validate the secure access link when the secure access link is used by the recipient to access the document.

5. The system of claim 1, wherein the at least one memory and the computer program code is further configured to, with the at least one processor, cause the at least one processor to:
   exchange onboarding data with a second document storage platform, the onboarding data exchanged with the second document storage platform including a second base address of the second document storage platform and the security key of the document access facilitator;
   receive a second document summary presentation message from a second presenter, the second document summary presentation message including a second document identifier associated with a second document stored in the second document storage platform and the recipient identifier associated with the recipient; and
   wherein the document summary presentation notification further includes the second document identifier and notifies the recipient that the second document stored in the second document storage platform is available for viewing by the recipient.

6. The system of claim 1, wherein the secure access link is valid to access the document only for a defined time period after generation.

7. The system of claim 1, wherein sending the document presentation request and sending the generated secure access link to the recipient includes sending the document presentation request and generated secure access link to a financial institution with which the recipient is associated, whereby the financial institution is enabled to forward the document presentation request and generated secure access link to the recipient.

8. A computerized method comprising:
   exchanging, by a document access facilitator, onboarding data with a document storage platform, the onboarding data including a base address of the document storage platform and a security key of the document access facilitator;
   receiving a document summary presentation message from a presenter, the document summary presentation message including a document identifier associated with a document stored in the document storage platform and a recipient identifier associated with a recipient;

sending a document summary presentation notification to the recipient using the recipient identifier, the document summary presentation notification including the document identifier and notifying the recipient that the document stored in the document storage platform is available for viewing by the recipient;

receiving a document presentation request by the document access facilitator from the recipient, the document presentation request including the document identifier;

generating, by the document access facilitator, a secure access link to the document using the base address, the document identifier, and the security key of the document access facilitator; and sending the generated secure access link to the recipient in response to the received document presentation request, causing the recipient to use the generated secure access link to access the document in the document storage platform.

9. The computerized method of claim 8, wherein the secure access link includes a replay tag that is used by the document storage platform to confirm that the secure access link is used only.

10. The computerized method of claim 8, further comprising:
validating the document presentation request based on the recipient from which the document presentation request is received matching the recipient of the recipient identifier included in the document summary presentation message; and
wherein generating the secure access link occurs after the document presentation request is validated.

11. The computerized method of claim 8, wherein generating the secure access link includes digitally signing a portion of data of the secure access link using the security key, whereby the document storage platform is enabled to verify the digitally signed portion of data to validate the secure access link when the secure access link is used by the recipient to access the document.

12. The computerized method of claim 8, further comprising:
exchanging onboarding data with a second document storage platform, the onboarding data exchanged with the second document storage platform including a second base address of the second document storage platform and the security key of the document access facilitator;
receiving a second document summary presentation message from a second presenter, the second document summary presentation message including a second document identifier associated with a second document stored in the second document storage platform and the recipient identifier associated with the recipient; and
wherein the document summary presentation notification further includes the second document identifier and notifies the recipient that the second document stored in the second document storage platform is available for viewing by the recipient.

13. The computerized method of claim 8, wherein the secure access link is valid to access the document only for a defined time period after generation.

14. The computerized method of claim 8, wherein sending the document presentation request and sending the generated secure access link to the recipient includes sending the document presentation request and generated secure access link to a financial institution with which the recipient is associated, whereby the financial institution is enabled to forward the document presentation request and generated secure access link to the recipient.

15. One or more computer storage media having computer-executable instructions that, upon execution by a processor, cause the processor to at least:
exchange onboarding data between a document storage platform and a document access facilitator, the onboarding data including a base address of the document storage platform and a security key of the document access facilitator;
receive a document summary presentation message from a presenter, the document summary presentation message including a document identifier associated with a document stored in the document storage platform and a recipient identifier associated with a recipient;
send a document summary presentation notification to the recipient using the recipient identifier, the document summary presentation notification including the document identifier and notifying the recipient that the document stored in the document storage platform is available for viewing by the recipient;
receive a document presentation request, by the document access facilitator, from the recipient, the document presentation request including the document identifier;
generate a secure access link, by the document access facilitator, to the document using the base address, the document identifier, and the security key of the document access facilitator; and
send the generated secure access link to the recipient in response to the received document presentation request, causing the recipient to use the generated secure access link to access the document in the document storage platform.

16. The one or more computer storage media of claim 15, wherein the secure access link includes a replay tag that is used by the document storage platform to confirm that the secure access link is used only once.

17. The one or more computer storage media of claim 15, wherein the computer-executable instructions, upon execution by a processor, further causes the processor to at least:
validate the document presentation request based on the recipient from which the document presentation request is received matching the recipient of the recipient identifier included in the document summary presentation message; and
wherein generating the secure access link occurs after the document presentation request is validated.

18. The one or more computer storage media of claim 15, wherein generating the secure access link includes digitally signing a portion of data of the secure access link using the security key, whereby the document storage platform is enabled to verify the digitally signed portion of data to validate the secure access link when the secure access link is used by the recipient to access the document.

19. The one or more computer storage media of claim 15, wherein the computer-executable instructions, upon execution by a processor, further causes the processor to at least:
exchange onboarding data with a second document storage platform, the onboarding data exchanged with the second document storage platform including a second base address of the second document storage platform and the security key of the document access facilitator;
receive a second document summary presentation message from a second presenter, the second document summary presentation message including a second document identifier associated with a second document stored in the second document storage platform and the recipient identifier associated with the recipient; and wherein the document summary presentation notification further includes the second document identifier and notifies the recipient that the second document stored in the second document storage platform is available for viewing by the recipient.

20. The one or more computer storage media of claim 15, wherein the secure access link is valid to access the document only for a defined time period after generation.

\* \* \* \* \*